(12) United States Patent
Shatil et al.

(10) Patent No.: US 9,319,960 B2
(45) Date of Patent: Apr. 19, 2016

(54) ESTABLISHING MOBILE CONNECTIVITY CONDITIONS FOR MOBILE SUBSCRIBER UNITS IN A WIRELESS COMMUNICATION NETWORKS

(71) Applicant: SYMBOL TECHNOLOGIES, LLC, Lincolnshire, IL (US)

(72) Inventors: Ohad Shatil, Atlanta, GA (US); Win Nu Nu Win, Palatine, IL (US)

(73) Assignee: Symbol Technologies, LLC, Holtsville, NY (US)

( * ) Notice: Subject to any disclaimer, the term of this patent is extended or adjusted under 35 U.S.C. 154(b) by 113 days.

(21) Appl. No.: 13/868,688

(22) Filed: Apr. 23, 2013

(65) Prior Publication Data

US 2014/0315542 A1    Oct. 23, 2014

(51) Int. Cl.
*H04W 36/32* (2009.01)
*H04W 36/00* (2009.01)
*H04W 36/24* (2009.01)

(52) U.S. Cl.
CPC .......... *H04W 36/32* (2013.01); *H04W 36/0083* (2013.01); *H04W 36/245* (2013.01)

(58) Field of Classification Search
CPC .................................................. H04W 36/32
See application file for complete search history.

(56) References Cited

U.S. PATENT DOCUMENTS

| 7,397,779 B2 | 7/2008 | Chandra et al. |
| 7,447,176 B2 | 11/2008 | Ruan et al. |
| 8,289,925 B2 | 10/2012 | Ore et al. |
| 2007/0041344 A1 | 2/2007 | Yaqub et al. |
| 2007/0115899 A1 | 5/2007 | Ovadia et al. |
| 2008/0049702 A1 | 2/2008 | Meylan et al. |
| 2008/0064404 A1 | 3/2008 | Zhang et al. |
| 2008/0076423 A1 | 3/2008 | Lee et al. |
| 2009/0022106 A1* | 1/2009 | Ue et al. ........................ 370/331 |

(Continued)

FOREIGN PATENT DOCUMENTS

| EP | 2 183 936 A2 | 5/2010 |
| JP | 5102296 B2 | 12/2012 |
| WO | 2009022967 A2 | 2/2009 |

(Continued)

OTHER PUBLICATIONS

IEEE Standard for Information Technology Part 11 Wireless LAN Medium Access Control (MAC) and Physical Layer (PHY) Specifications, Copyright 2008 IEEE.

(Continued)

*Primary Examiner* — Kashif Siddiqui

(57) ABSTRACT

An apparatus and method for establishing mobile connectivity conditions for mobile subscriber units in a wireless communication network includes scanning, by each mobile subscriber unit, for candidate access points and affiliated channels for roaming, whereupon the unit can roam from an originating access point to one of the candidate access points on an affiliated channel for roaming. A link record in the mobile subscriber unit is used for recording an entry including the originating access point, the candidate access point, the affiliated channel for roaming, and a handoff experience value. The link record can be used upon subsequent roaming of the unit to attempt a self-devised handoff without further scanning for access points and affiliated channels. Link records can be shared between mobile subscriber units to speed up map building of link records.

17 Claims, 9 Drawing Sheets

(56) References Cited

U.S. PATENT DOCUMENTS

2011/0217977 A1   9/2011   Du et al.
2012/0230305 A1   9/2012   Barbu et al.

FOREIGN PATENT DOCUMENTS

WO   2009022967 A9   2/2009
WO   2009032713 A1   3/2009

OTHER PUBLICATIONS

Parikh, D. and Jancke, G., "Localization and Segmentation of a 2D High Capacity Color Barcode," IEEE Workshop on Applications of Computer Vision, 2008, (WACV 2008), pp. 1-7, [Retrieved from http://citeseerx.ist.psu.edu/viewdoc/download;jsessionid=F726100BFC93BDE4BD2A12A6EDA0821D?doi=10.1.1.218.125&rep=rep1&type=pdf on May 28, 2014].

\* cited by examiner

NODE 1x: [6y, ch48, 10:55:00, <own_id>, 5, 1],
        [6x, ch6, 10:55:20, <own_id>, 4, 1]  ← 60

NODE 1y: [2x, ch6, 10:53:20, <own_id>, 5, 1],
        [4y, ch153, 10:53:40, <own_id>, 4, 1]

NODE 2x: [1y, ch36, 10:53:20, <own_id>, 5, 1],
        [7x, ch6, 10:57:20, <own_id>, 3, 1]  ← 60

NODE 2y: [4x, ch11, 10:54:20, <own_id>, 4, 1],
        [4y, ch153, 10:54:00, <own_id>, 3, 1]

NODE 4x: [2y, ch149, 10:54:20, <own_id>, 4, 1],
        [6y, ch48, 10:54:40, <own_id>, 5, 1]

NODE 4y: [1y, ch36, 10:53:40, <own_id>, 4, 1],
        [2y, ch149, 10:54:00, <own_id>, 3, 1]

NODE 6x: [7x, ch6, 10:57:00, <own_id>, 4, 1],  ← 60
        [1x, ch1, 10:55:20, <own_id>, 4, 1 ]  ← 60

NODE 6y: [1x, ch1, 10:55:00, <own_id>, 5, 1],
        [4x, ch11, 10:54:40, <own_id>, 5, 1]

NODE 7x: [6x, ch6, 10:57:00, <own_id>, 4, 1],  ← 60
        [2x, ch6, 10:57:20, <own_id>, 3, 1]  ← 60

NODE 7y:

*FIG. 6*

ESTABLISHING MOBILE CONNECTIVITY CONDITIONS FOR MOBILE SUBSCRIBER UNITS IN A WIRELESS COMMUNICATION NETWORKS

BACKGROUND

Wireless communication networks, such as wireless wide-area network or wireless local-area networks (WLAN) such as IEEE 802.11 wireless communication networks are able to provide communications for their mobile subscriber units (MSU) utilizing wireless access support through local access points (AP). One task that any MSU typically deals with is an ongoing evaluation of mobile connectivity conditions in the radio frequency (RF) environment in order to make informed decisions to maintain a stable wireless connection with seamless handoffs within the network as the MSU roams through the network. The MSU, for example, can scan for all neighboring APs and evaluate conditions on all available channels to determine good handoff candidates. However, this requires an extensive amount of communications overhead, processing, time, and battery power on the part of the MSU.

For example, the MSU uses critical roaming decisions algorithms to find nearby Basic Service Set Identifiers (BSSIDs) by dwelling its receiver for some significant amount of time on each of the available different channels (pending if passive or active scan or both), to see if more coverage is available. Additionally, this is done without a pre-assessment of the channel occupancy, to know if it is even worthwhile investing that time and power, and even if the coverage is to be found that coverage might have problems with interference, weak signals, etc. If an MSU is lucky, a reasonably strong neighbor BSSID may be found quickly. However, on average, by the time a good BSSID is found more scanning time is spent, and during that time the MSU could be moving, which could weaken the connection with a currently-serving BSSID too much, and the decision to handoff to next BSSID may be too late, risking the loss or dropping of packets.

A number of WLAN protocols facilitate information exchange between the MSU and APs with regards to RF conditions. For example, Institute of Electrical and Electronics Engineers (IEEE) 802.11k can inform the MSU with Radio Resource Measurements data, which is compiled to reflect RF utilization, load, capacity, noise, interference, central modeling of the network, etc. This data is very helpful for an MSU's scanning and roaming decisions. However, producing this information requires active messaging between the MSU and AP, and is not under the control of the MSU. In addition, this active messaging is not trivial to synchronize, and could be interruptive when there is an active voice or video session over a current WLAN link.

Accordingly, there is a need for a technique for mobile subscriber units to establish mobile connectivity conditions in a network, while eliminating the aforementioned issues. Furthermore, other desirable features and characteristics of the present invention will become apparent from the subsequent detailed description and the appended claims, taken in conjunction with the accompanying drawings and the foregoing background.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 6 is a listing of a modified link record from FIG. 5.

Figure 1:
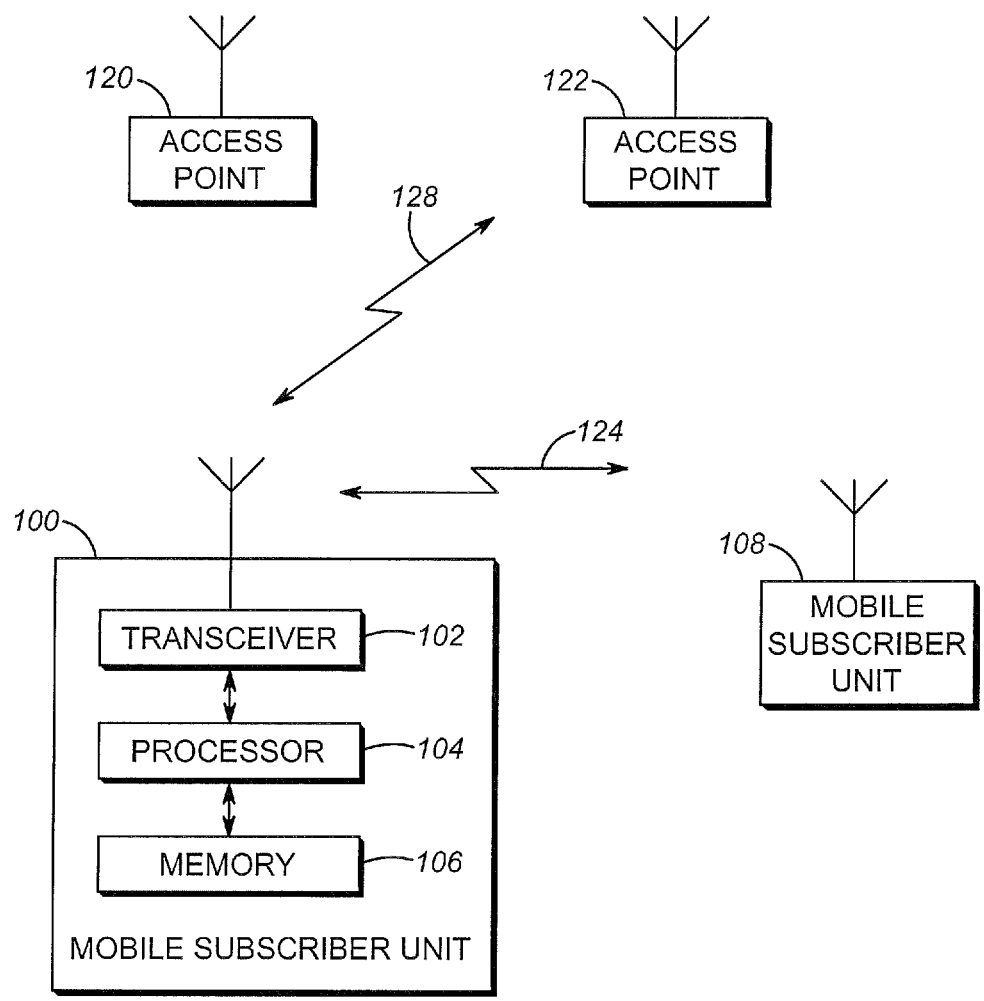
FIG. 1 is a simplified block diagram of a wireless communication network, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides a novel technique to establish mobile connectivity conditions for a mobile subscriber unit (MSU) in a wireless communication network. In particular, the present invention builds a link record describing a handoff experience values for the MSU for specific access point (AP) and affiliated channels used for roaming. It then uses this link record to perform self-devised handoffs—using previously established links. The term "self-devised" is used herein in view of connectivity. The mobile subscriber unit (MSU) can roam using its self-made link record as source of data about the network and the RF environment, for facilitating trusted selection of a target AP for the handoff, without the need for an additional source of handoff data such as fresh scanning of RF channels or interactive exchange of information with the network.

FIG. 1 is a block diagram depiction of one embodiment of the present invention utilizing a wireless local-area communication network, including IEEE 802.11 wireless communication systems, as the example described herein. However, it should be recognized that the present invention is also applicable to other wireless communication systems. At present, standards bodies such as OMA (Open Mobile Alliance), 3GPP (3rd Generation Partnership Project), 3GPP2 (3rd Generation Partnership Project 2) and IEEE (Institute of Electrical and Electronics Engineers) 802 are developing standards specifications for such wireless telecommunications systems. The communication system represents a system operable in a network that may be based on different wireless protocols. For example, the description that follows can apply to a wireless wideband area network or other network, employing wireless technologies such as IEEE's 802.11, 802.16, or 802.20, modified to implement embodiments of the present invention.

Referring to FIG. 1, there is shown a block diagram of wireless communication network having a plurality of access points (AP) 120, 122 and at least one mobile subscriber unit (MSU) 100, 108 adapted to support the inventive concepts of the embodiments of the present invention. The network will have Basic Service Set IDs (BSSIDs) addresses of the APs used in the network. Those skilled in the art will recognize that FIG. 1 does not depict all of the network equipment necessary for system to operate but only those system components and logical entities particularly relevant to the description of the embodiments herein. For example, an access point, access port, eNodeB, or base station can be connected with or comprise one or more devices such as wireless area network stations (which include access nodes (ANs), Media Access Controllers (MAC), AP controllers, and/or switches), base transceiver stations (BTSs), base site controllers (BSCs), packet control functions (PCFs), packet control units (PCUs), and/or radio network controllers (RNCs). However, none of these other devices are specifically shown in FIG. 1. In addition, central controller or servers may be implemented, but are not shown.

MSU 100 is depicted in FIG. 1 as comprising a processor 104 coupled to a transceiver 102 and memory 106. In general, components such as processors, memories, and transceivers are well-known. For example, the transceiver 102 is operable to communicate with user devices over an IEEE 802.11 interface. As used herein, the terms transceiver and receiver can be used interchangeably, and the terms transceiver and transmitter can be used interchangeably. In addition, processing units are known to comprise basic components such as, but not limited to, microprocessors, microcontrollers, memory cache, application-specific integrated circuits (ASICs), and/or logic circuitry. Such components are typically adapted to implement algorithms and/or protocols that have been expressed using high-level design languages or descriptions, expressed using computer instructions, expressed using messaging logic flow diagrams. Thus, given an algorithm, a logic flow, a messaging/signaling flow, and/or a protocol specification, those skilled in the art are aware of the many design and development techniques available to implement an MSU processor that performs the given logic. MSUs can also comprise an antenna, a keypad, a speaker, a microphone, and a display, as are known in the art, but not shown. Therefore, MSU 100 represents a known apparatus that has been adapted, in accordance with the description herein, to implement various embodiments of the present invention. MSUs or remote unit platforms are known to refer to a wide variety of consumer electronic platforms such as clients, mobile stations, mobile nodes, user equipment, user stations, subscriber equipment, subscriber stations, access terminals, remote terminals, terminal equipment, gaming devices, personal computers, and personal digital assistants, and the like, all referred to herein as MSU.

The APs 120, 122 in FIG. 1 use a local area wireless interface for communication with at least one MSU 100, 106. The local area wireless interface can include a forward link and a reverse link used in communications between the MSU and the AP. APs and MSUs are known to comprise basic components such as, but not limited to, microprocessors, digital signal processors (DSPs), microcontrollers, memory devices, application-specific integrated circuits, and/or logic circuitry. Such devices are typically adapted to implement algorithms and/or protocols that have been expressed using high-level design languages or descriptions, expressed using computer instructions, expressed using messaging/signaling flow diagrams, and/or expressed using logic flow diagrams. Thus, given an algorithm, a logic flow, a messaging/signaling flow, a call flow, and/or a protocol specification, those skilled in the art are aware of the many design and development techniques available to implement user equipment that performs the given logic.

Referring back to FIG. 1, in a first embodiment, the present invention provides a novel technique for an MSU to establish mobile connectivity conditions in a wireless communication network, to be used to attempt self-devised handoff, based on link records, without performing any typical other methods for finding potential handoff candidates. MSU 100 is currently being served by an access point 120 and may be triggered to handoff to another access point 122.

The transceiver 102 is operable to scan for candidate access points 122 and affiliated channels for roaming. The processor 104 is operable to direct roaming of the mobile subscriber unit from the originating access point 120 to one of the candidate access points 122 on an affiliated channel for roaming. The memory 106 is operable to record, in a link record, an entry including an identity of the originating access point 120, an identity of the candidate access point 122, the affiliated channel for roaming, and a handoff experience value, in accordance with the present invention.

The handoff experience value is quantified using parameters including an indicator as to how well a successful handoff was completed. This entry can also include a creation time of the entry and an identifier of the mobile subscriber unit that created the entry. This entry can further include a number of times that the entry has been used for handoffs. An entry is only created when a handoff has been successful from one node to another, and indicates that those nodes are linked (overlap) in RF coverage. The overlap is bi-directional, i.e. the nodes can see each other. Therefore, along with the entry the link record also records a separate complementary entry that assumes a reverse handoff from the candidate access point to the originating access point using the same affiliated channels for handoff and having the same handoff experience value, in accordance with the present invention. As a result, two entries are created in the link record for each single successful handoff. The term "successful" as used herein can be limited to only those handoffs having a successful first-attempt of 802.11 reassociation in order be a valid record entry. Successful could also encompass several handoff attempts as long as they are reassociations with and no transition to needing to a full initial association. Successful could also include a time limit, wherein a successful handoff means the handoff was accomplished with a certain time period. The link record is dynamic and builds a map of the access points and the affiliated channels used in the network from successful handoffs of the mobile subscriber unit.

Optionally, mobile subscriber units 108 can share 124 their link record with other mobile subscriber units 100 such that each mobile subscriber unit can integrate its entries with those entries from other mobile subscriber units. Sharing can use one or more specialized Information Elements in a data header indicating that the data include a snap shot of the link record for that MSU. The header can include the MSU's network profile (SSID, security parameters) in an encrypted format, so that other MSUs capturing the broadcast can verify that they belong to that network. This information can be broadcast 124 at predetermined specific intervals, such as directly after a beacon signal from the access point. Each MSU is configured to recognize this information and is ready to receive and parse the incoming link record to be integrated with its own. Although this information can be shared directly between MSUs, it should be recognized that the information could be sent via the network infrastructure, i.e. APs and servers. Integrating entries includes adding new entries concerning access points and affiliated channels not used before by the mobile subscriber unit, and overwriting entries concerning access points and affiliated channels used earlier by the mobile subscriber unit with later information. Integrating can also be used in special cases for a quick bring-up to speed of a powering-up MSU, where its table is still empty. The powering-up MSU will get input from other MSUs shortly after and will have the combined knowledge, so "learning time" is very short. Also, a quick bring-up to speed can be done for an MSU that is "now" moving from one physical zone (building, floor, etc) to another, and its current content is not useful in the new area. In this way, the MSU will get input from other MSUs which already have link records pertaining to the new location.

The processor 104 is further operable to use the link record upon subsequent roaming of the mobile subscriber unit to attempt a self-devised handoff 128 without having the transceiver perform further scanning for access points and affiliated channels. In particular, the entry having the highest handoff experience value is used for the self-devised handoff attempt without performing any further scanning for access points or channels. If that handoff to highest experience value entry fails, and attempt can be immediately made to second highest entry in the list of the records. And so forth. If the self-devised link record based handoff attempt(s) fails a further scan is used to find handoff candidates, as usual. Otherwise, the link record can be used for subsequent handoffs. If upon a handoff, the handoff experience has changed from that previously recorded in the link record, the recording step includes deleting an earlier recorded entry if there is a conflict with information resulting from a later handoff. The actual technique for building the link record is described below.

Figure 2:
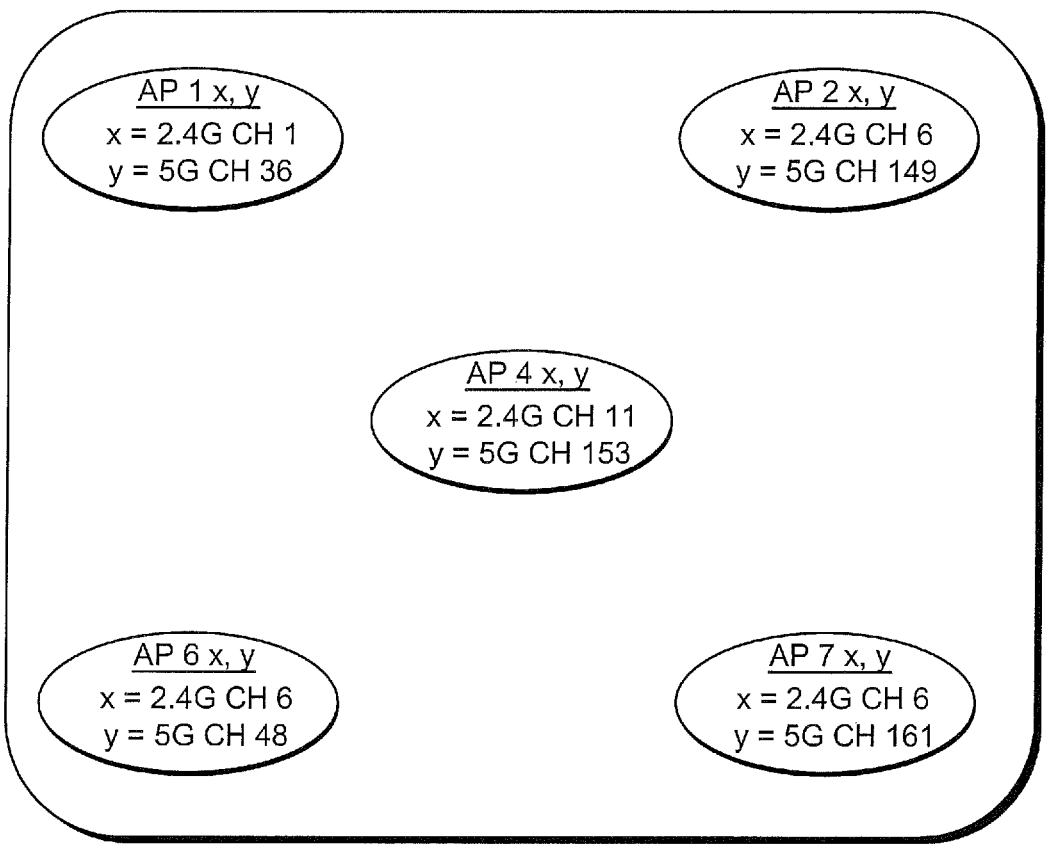
FIG. 2 is a simplified diagram of access points in the wireless communication network, in accordance with some embodiments of the present invention.

Referring to FIG. 2, a wireless communication network is shown comprising five access points, AP 1, AP 2, AP 4, AP 6, AP 7. It should be recognized that many other access points can be included in the network. In this network configuration, each of the access points is dual-band, having two radio nodes that are operable on two different frequency bands (e.g. a 2.4 GHz node and a 5 GHz node). Further, each node is assigned to use only one assigned channel in its frequency band. For example, AP 1 is configured to use either channel 1 in the 2.4 GHz band (i.e. channel 1x which represents AP "1" using channel "x" of AP 1, or "1x") or channel 36 in the 5 GHz band (i.e. channel 1y). The other access points nodes are assigned their own channels x and y to use, as shown. The channel assignments for each node are predetermined upon the initial establishment of the network, although it should be recognized that channel assignments could be changed by the network infrastructure, which will be addressed below. As used herein, the term "node" is a radio WLAN cell, identified by a unique 802.11 BSSID.

Figure 3:
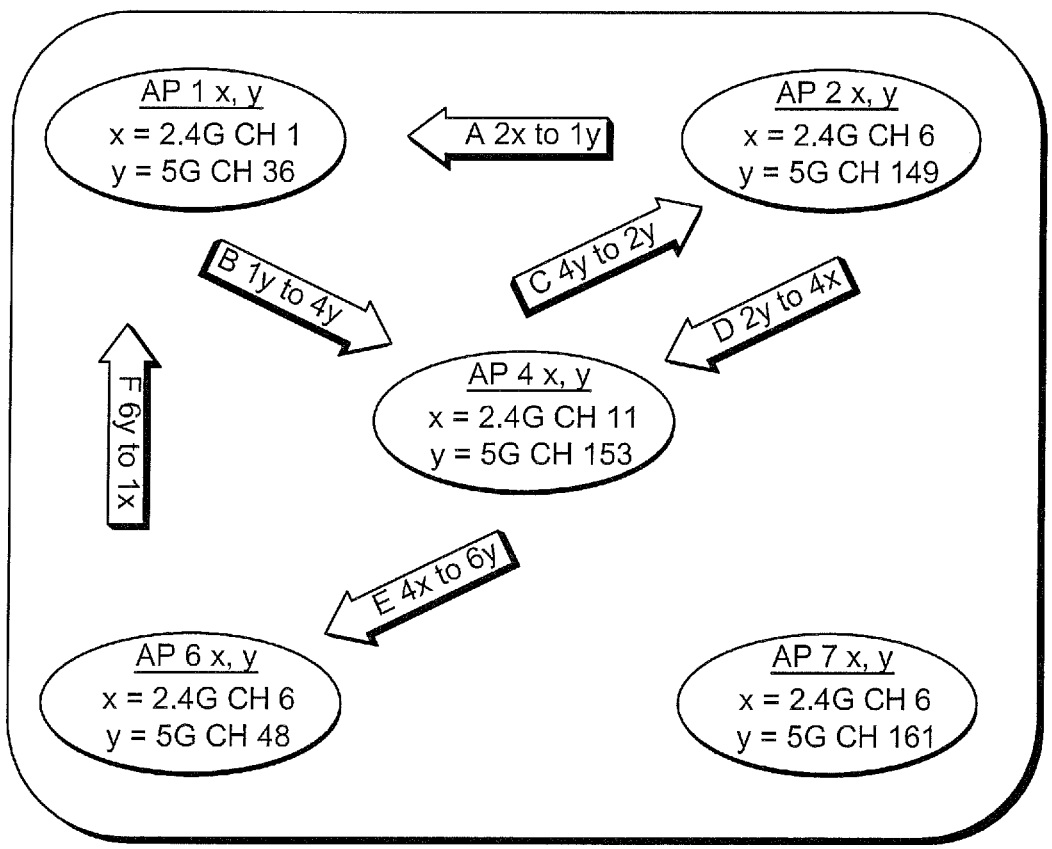
FIG. 3 is a simplified diagram of mobile subscriber unit handoffs between the access points of FIG. 2, in accordance with some embodiments of the present invention.

Referring to FIG. 3, a mobile subscriber unit (not shown) is able to roam among the access points in the network. For example, an MSU can start on AP 2 on channel 6 of the 2.4 GHz band (i.e. channel 2x). The MSU can then roam from channel AP 2 to AP 1, handing off to channel 36 of AP 1 (i.e. channel 1y). This is represented as arrow A showing a handoff from 2x to 1y. Similarly, the MSU can then roam from AP 1 to AP 4, shown as arrow B from 1y to 4y. The MSU can then roam from AP 4 back to AP 2, shown as arrow C from 4y to 2y, and then back from AP 2 to AP 4, shown as arrow D from 2y to 4x. The MSU can then roam from AP 4 to AP 6, shown as arrow E from 4x to 6y. The MSU can then roam from AP 6 to AP 1, shown as arrow F from 6y to 1x. Each of these handoffs is used for an initial build-up of the link record.

Figure 4:
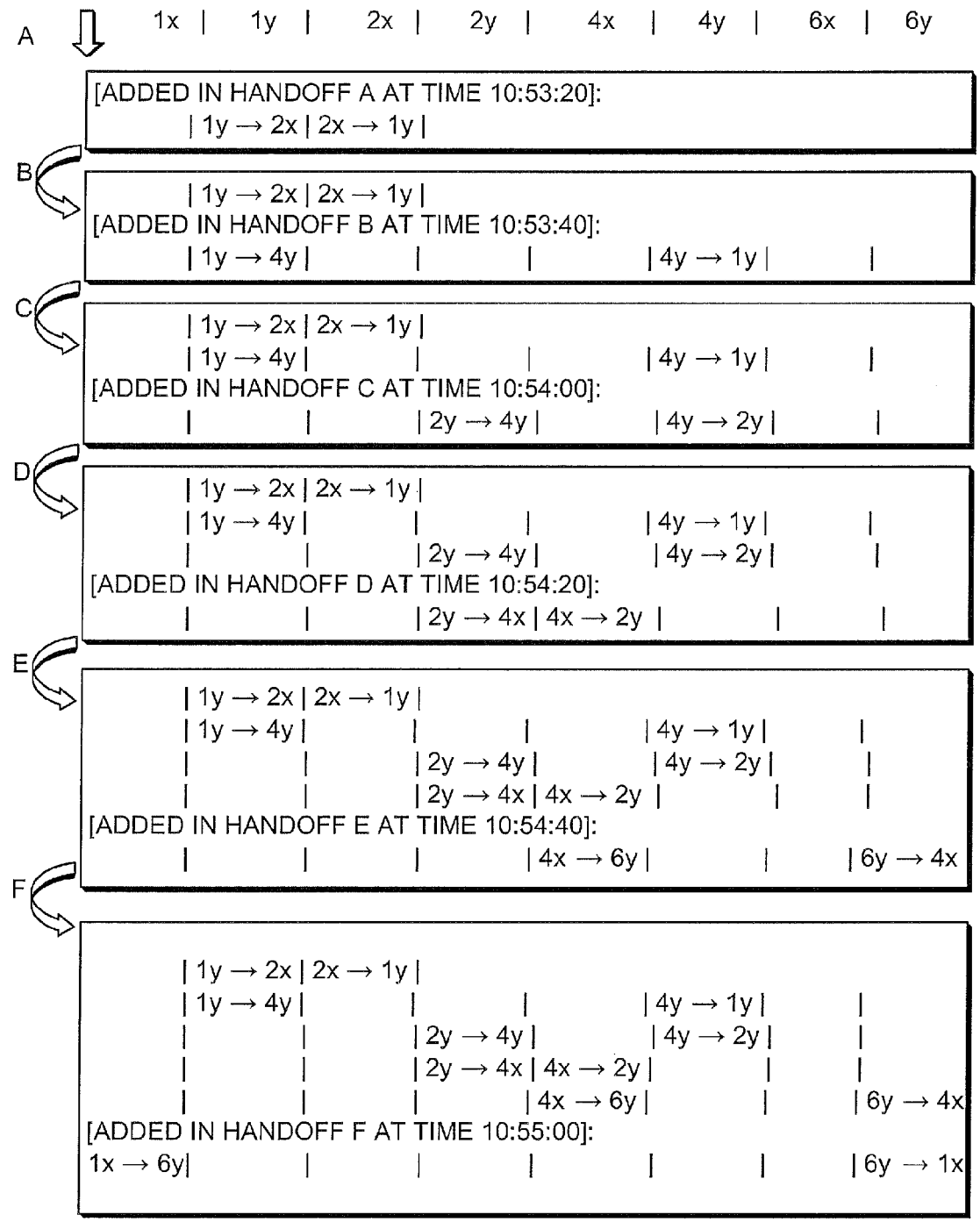
FIG. 4 is a flow chart demonstrating the building of a link record of a mobile subscriber unit, in accordance with some embodiments of the present invention.

In particular, each of these handoffs (A-F) is tabulated as shown in FIG. 4, where each roam is recorded identifying the originating access point/channel, destination access point/channel, and the time of the handoff. However, the present invention also records a complementary entry that assumes a reverse handoff from the candidate access point to the originating access point using the same affiliated channels for handoff. For example, in step A, although the handoff was from 2x to 1y, the present invention also include an entry for 1y to 2x, assuming that the handoff experience would be similar traveling either way between AP 1 and AP 2.

Figure 5:
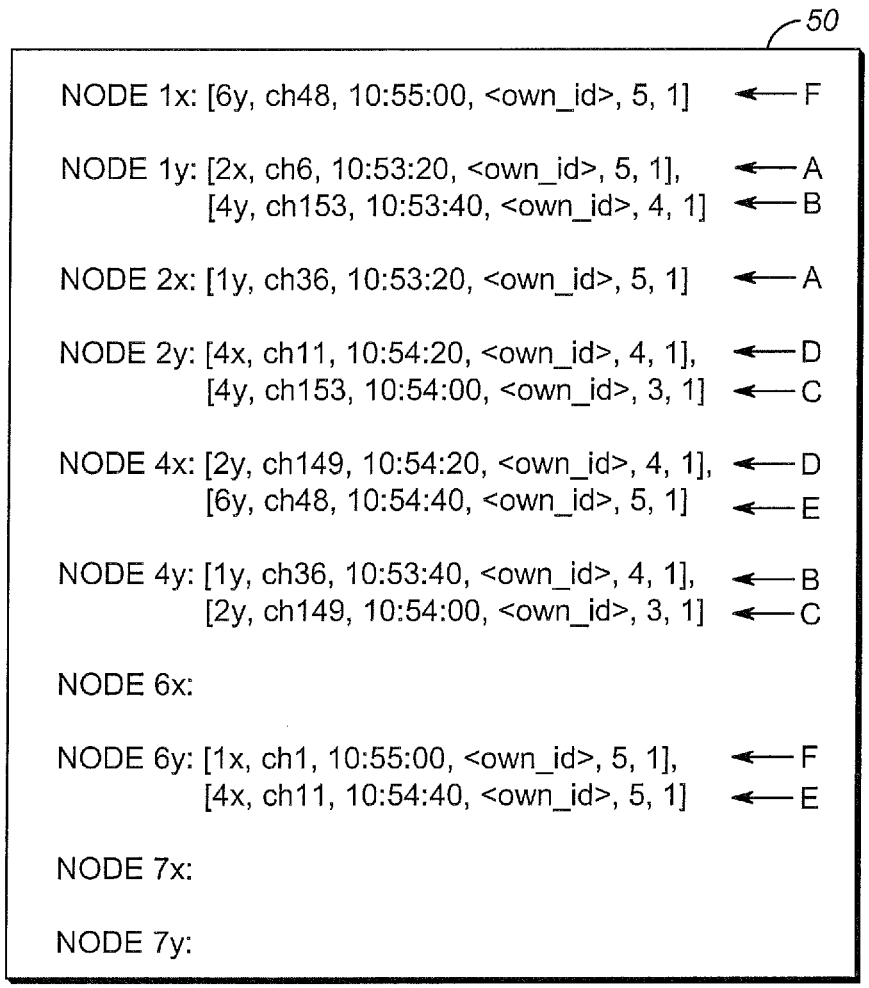
FIG. 5 is a listing for the link record built in FIG. 4.

Using the tabulated handoffs from FIG. 4, the present invention builds a link record 50 as shown in FIG. 5. Each entry of the link record includes an particular structure including an identity of the originating node, an identity of the handoff candidate node, the affiliated handoff channel, a timestamp, an identity of the MSU that made the entry (e.g. a Media Access Control address), a handoff experience value, and a number of times that this particular handoff link has been successfully completed. For example, at one time an MSU was present on Node 1x and handed off to Node 6y. The MSU handed off to channel 48 of AP 6 at the time of 10:55:00. The identity of the MSU is shown as <own_id>. The calculated value of the handoff experience is 5, and this handoff was performed only 1 time. This handoff occurs during step F from FIG. 4. The link record includes a complementary entry (F) assuming a reverse handoff from Node 6y to 1x. This complementary entry notes the assumed handoff channel 1 of AP 1, and uses the same time of 10:55:00, the same identity of the MSU (<own_id>), the same calculated value of the handoff experience (5), and the same number of times that the assumed handoff was performed (1) as the original entry F. The remainder of the link record includes two entries for every other handoff A-E in a similar manner. It should be noted that the MSU has not yet roamed to either node of AP 7 or to node x of AP 6 so there is no entries in the link record for those nodes yet.

The timestamp is an identification of synchronized system-time of creation or last-modification of the content of the entry. The timestamp can represent the first time the entry is created or the time of modification if the MSU has repeated the same handoff. The time stamp can also be the time of modification that is result of external-integration of the entry from another MSU. If that is the case, the time shall be the already-recorded time inside the other MSU record entry (and not the time of the integration/sharing itself).

The handoff experience value is a new value uniquely defined in the present invention. This value can include several weighted elements newly defined for the present invention. One element is a measurement of the time in finding a handover target. Initially the value of this element will be low since the first time that an entry is made is likely a result of scanning for neighboring access points and channels, if it has not been provided by link records from external means. However, once an entry is established and self-devised handoff can use the entry, this time will be improved, but the time will still depend on the size of the list of link record entries that are queued to be attempted for handoff, and whether the candidate handoff node responds the first, second, third, etc. probe request of the self-devised handoff attempt.

Another element of handoff experience value is a performance score that includes: a total speed of the IEEE 802.11 stage of the handoff, a total speed of a WLAN-Security (EAP/

EAPOL) stage of the handoff, which is coming directly after the 802.11 stage, and how quickly application traffic (e.g. data/voice/video or any non-WLAN management messaging) is resumed right after completion of the handoff.

Another element of handoff experience value is a receive/transmit score that describes a packetizing responsiveness of all of the above. This score can describe when handoff related packets need to be retried (one or more, or go down in datarate scaling, and so on) in order to secure the successful handoff completion, the "cleanest" responsiveness (highest score) would be when no packet at all needed to be retried. Opposite of that would be when retries are almost exhausted to maximum number of retries for almost the entire duration of the handoff, while still continuing and "accepting" the handoff for completion. The handoff experience value can also include versions of quality factors such as signal strength, quality of service, noise, interference, load, a maturity of the data, etc.

FIG. 6 shows the link record 50 of FIG. 5 that has been modified after the MSU has roamed some more through the wireless communication network. In this case, the link record has many added entries 60, but it should be noted that the MSU has not yet roamed to node y of AP 7 so there is no entries in the link record for that node yet.

Figure 7:
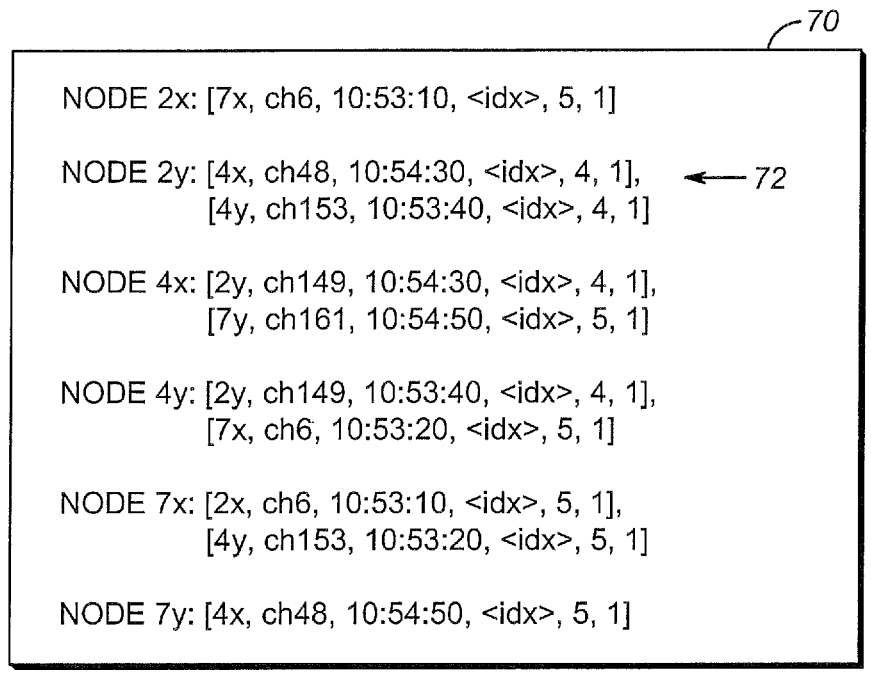
FIG. 7 is a listing for a link record of a different mobile subscriber unit, in accordance with some embodiments of the present invention.

FIG. 7 shows the link record 70 of a second MSU, where the link record was built by that second MSU as it roamed through the network. This second MSU is able to share its link record with the first MSU, wherein the first MSU can integrate the link record of the second MSU into its own link record.

Figure 8:
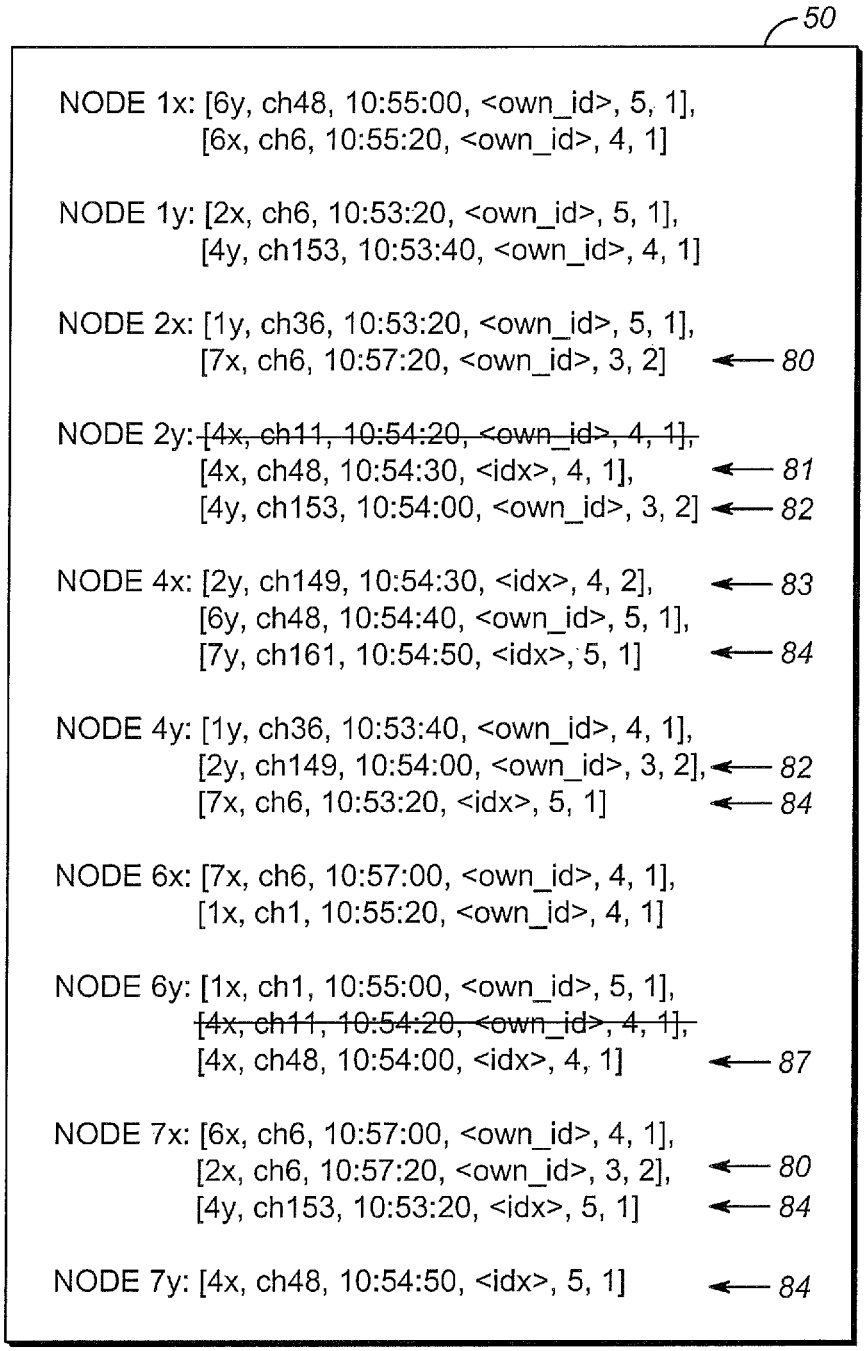
FIG. 8 is a listing of a further modified link record from FIG. 6 modified with the listing from FIG. 7.

FIG. 8 shows the integration of the link record 70 (from FIG. 7) of the second MSU into the link record 50 (of FIG. 6) of the first MSU. It can be seen that FIG. 6 and FIG. 7 both have an entry for a handoff from node 2x to 7x (and the complementary 7x to 2x) with different values. It can be seen that the FIG. 6 entry is later. Therefore, the integrated entries 80 reflects the latter entry showing the latter value for handoff experience, and incrementing the number of handoffs to 2 since there have been two 2x to 7x handoffs (and two 7x to 2x complements).

It can also be seen that FIG. 6 and FIG. 7 both have an entry for a handoff from node 2y to 4x, with conflicting channels, i.e. channel 11 in FIG. 6 versus channel 48 in FIG. 7. Since the FIG. 7 entry 72 is later it must be that node 4x has changed its operating frequency to channel 48. Therefore, the integrated entry 81 deletes the old FIG. 6 entry and uses the more recent FIG. 7 entry 72 identifying the second MSU (<idx>). Because the old entry has been deleted, the value for the number of handoffs is reset to 1 since the previous entry is unreliable. For example, when it is detected that an AP has changed a channel assignment to its radio, the MSU assumes that many radio parameters of the AP have been reset as well as the channel itself, which directly affects a new balance of its RF characteristics, and that in turn affects all of the measurements affiliated with that AP. Thus, the MSU prefers not to rely on any previous (previous to the change) RF knowledge about that AP. This is different than other types of updates where the channel remains the same, such as a different "experience" that's coming from different times or different MSUs, which are subjective assessments by the MSU and not the AP, thus an individual MSU is "allowed" to make "private" preferences of how exactly to integrate link records. It should be noted that if the 4x entry is deleted all other entries 87 for a 4x handoff are deleted and changed to reflect the new information. Any complementary entries 83 are not deleted since the 2y channel has not changed.

As used herein, the term "conflict" of entries may be between earlier and new link handoffs made by the MSU itself <own_id>, an earlier handoff made by <own_id> and a new handoff made by a sharing (other MSU), an earlier handoff made by another MSU (from a previous sharing of the link record) and a new handoff made by the <own_id> MSU, and an earlier and new handoff both obtain from other MSUs as a result of sharing of link records.

It can also be seen that FIG. 6 and FIG. 7 both have an entry for a handoff from node 2y to 4y (and the complementary 4y to 2y), with different handoff experience values. It can be seen that the FIG. 6 entry is later. Therefore, the integrated entries 82 reflects the latter entry showing the latter value for handoff experience, and incrementing the number of handoffs to 2. Optionally, an average handoff experience value could be used, where the handoff experience value is averaged over all recorded handoffs.

It can also be seen that FIG. 6 and FIG. 7 both have an entry for a handoff from node 4x to 2y, with the same values. However, it can be seen that the FIG. 6 entry is later. Therefore, the integrated entry 83 in FIG. 8 reflects the latter timestamp, and increments the number of handoffs to 2.

It can also be seen that only FIG. 7 has entries for a handoff from node 4x to 7y and 4y to 7x (and the complementary 7y to 4x and 7x to 4y). Therefore, the integrated entries 84 in FIG. 8 that reflect the FIG. 7 entries are added to the link report. It should be noted that the 7y to 4x already has the new channel number from FIG. 7.

The link record is a dynamic record that can be modified with every handoff of the MSU, or from a download of a snapshot of a link record from another MSU in the same network deployment. Modification can simply include modifying an entry with later, newer information, if there are no other conflicts. Modification can include replacing any one of the timestamp, the identity of the MSU that made the entry, the handoff experience value, and the number of times that this particular handoff link has been successfully completed. In addition, instead of replacing values, previous values can be averaged with new values.

The link record provides an ongoing map of AP/channel data in the network. When a handoff between two Basic Service Set Identifiers (BSSIDs) is successful then there is an intentional (planned) overlapping of coverage between the two BSSIDs, so the mutual-view of each other can be recorded, i.e. BSSID X can see BSSID Y, and Y can see X. In one embodiment, the link record can be published to the network infrastructure for global system optimization and to identify coverage issues.

The link record can be use for all subsequent handoffs by the MSU if there is an entry for that handoff. In particular, the link record can be used upon subsequent roaming to attempt a self-devised handoff without further scanning for access points and affiliated channels if there is an entry for that handoff. In particular, an existing entry having the highest handoff experience value is used for the self-devised handoff attempt to the node in that entry, without performing any scanning for access points or channels. For example, referring to the record 50 of FIG. 8, of an MSU is on node 1x and a handoff is triggered, the link record shows that there has been a successful previous handoff to either node 6x or 6y. The entry for node 6y has a higher handoff experience value than that for 6x so the MSU can attempt an immediate handoff to node 6y. If the immediate handoff to 6y fails, MSU can immediately continue to attempt a handoff to 6x. If all of the handoff attempts based on records in the list of the node (1x) are failing, then the MSU can scan for neighboring APs/channels for hand off as usual. However, if the self-devised record based handoff attempt is successful then the time normally needed for scanning has been saved and no network communications overhead or any scanning was needed.

In another embodiment of the present invention, the link record can be used to supplement subsequent scans for AP/channels. Up till now, the present invention addresses how a handoff operation can use link-record data, without any need for scanning at all. That is, at least as an attempt, records are used "immediately" per their priority and so on, which means that 802.11 handoff procedure can start right away, fully "trusting" the data in the records that the best AP to roam to is present, etc. This conceptually "separates" the handoff notion which follows a need (trigger) to roam, from the typical scanning notion which is following the need (trigger) to scan. A trigger to scan can be directly related with the same/adjacent trigger of the roam, but can also happen for totally different reasons, frequencies, and scanning-algorithms needs.

In accordance with the present invention, the data of the link-records can also be used for improving any kind of scanning (for any reason/trigger) that is related to an ongoing roaming operation (if an "immediate" roam using the link-record fails), or is used in context of a non-roaming sequence, which does not matter. The improved scanning function starts at the scan-trigger and ends at the results of the improved/abbreviated scan, which can then determine whether to end the entire scan-cycle or whether more scanning is needed. By using the link-records database, scanning is greatly improved because it will likely satisfy the criteria of desired results in the amount of time as the abbreviate-scan only. That is, the APs that are known to be there are scanned first, to only prove that they indeed are still there and their entry can be updated with fresh data. In operation, the processor of the MSU will fetch the link record from memory and determine the Node ID which matches the currently serving AP (i.e. the AP that is now in 802.11 connected state). In a first phase, the MSU will then loop through the list of the link record entries for that Node ID, and send a pre-configured amount of 802.11-Direct-Probe-Request(s) to each of the record nodes. Each Probe-Request to each node can be a unicast packet that includes the respective node's BSSID in the Destination-Address (DA) of the header, and can include the SSID string in the Information Element (IE). Probes-Requests are transmitted over the air only on the respective affiliated channel. At the end of the loop, the MSU can determine if the results from the scan satisfy criteria of "expected" coverage from the Neighboring BSSID that just responded. The "expected" term is the number of neighboring APs responding and satisfying dBm thresholds. If the "expected" criteria are not fulfilled then the MSU loops through the list of the link record entries for that Node ID in a second phase, fetches only the different channels that are recorded in the affiliated channel parameters, and sends a pre-configured amount of 802.11-Broadcast-Probe-Request(s) on each of the channels. Each request on each respective channel can be a broadcast packet, setting a MAC-Broadcast Address in the Destination-Address (DA) of the header, and can include the SSID string in the Information Element (IE). The time needed to execute the first and second phase for self-devised handoff is referred to as a time A. This time A along with a time B to execute an active scan for handoff is referred to as a scan cycle. On average, time A is 20% of time B. In most cases, self-devised handoff is successful and time B is saved altogether, so the handoff cycle is reduced to less than a quarter of an existing active scan cycle. In some cases, time A plus part of time B needed to compensate for missing data, wherein the cycle time is reduced to about half of existing active scan cycle. In the case where the self-devised handoff fails, and an active scan is then needed, then the time A plus all of the full time B needed, and time A is wasted.

For a given AP in the network that has between two to four neighbors (or more), with APs that are within RF sight of each other, if an MSU's database is empty or nearly-empty, and very little is yet to be shared from other MSUs (which can be an example of initial launch of devices in the environment), then the rate of success of the present invention is low, and most times there is a need for active scanning. Otherwise, during normal operation of the present invention, which should be about "80%" of the time, the rate of success of the present invention is near 100%, meaning that there is almost no need to spend time on other active scans, and there is an opportunity to save battery life. If a given AP in the network is located more on the edge of the network, or otherwise simply does not have good overlap with other APs, then the rate of success of the present invention is unpredictable.

Figure 9:
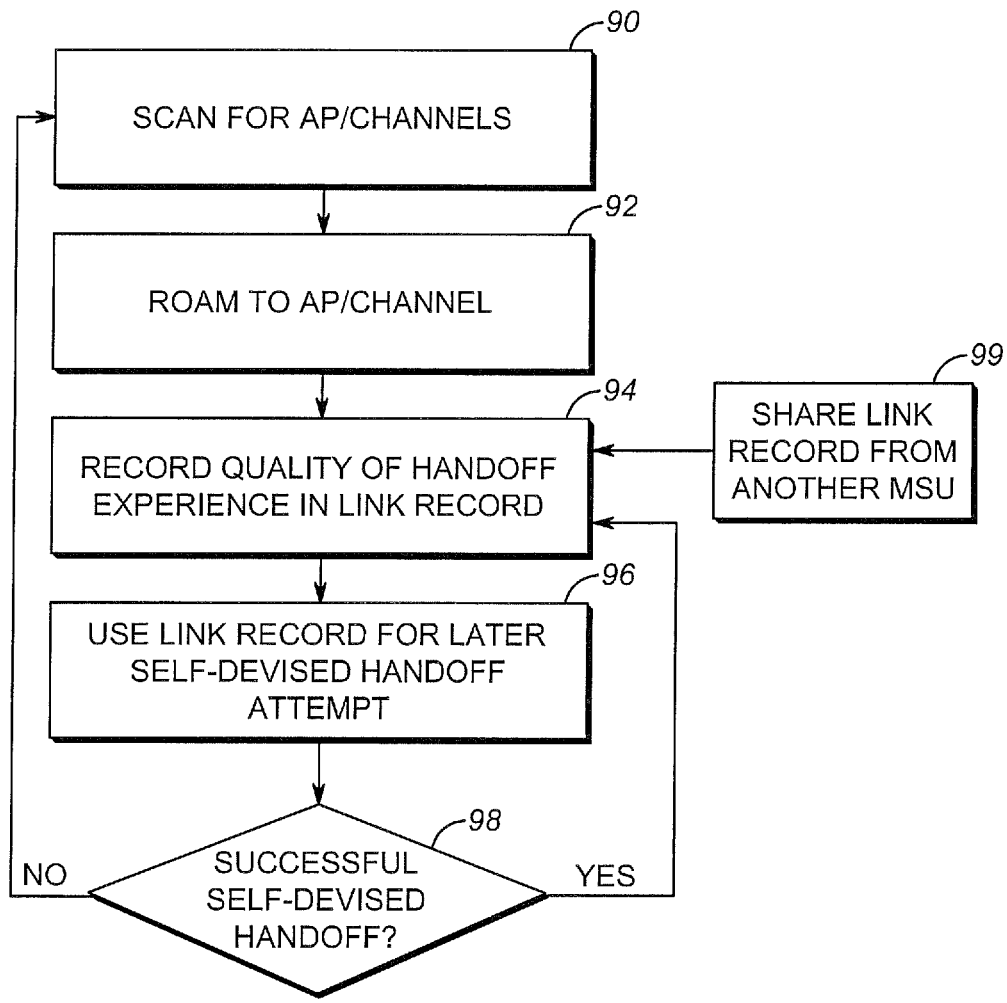
FIG. 9 is a simplified flow chart of a method, in accordance with some embodiments of the present invention.

FIG. 9 illustrates a flowchart of a method for establishing mobile connectivity conditions for mobile subscriber units in a wireless communication network. One step of the method includes scanning 90, by each mobile subscriber unit, for candidate access points and affiliated channels for roaming.

Another step includes roaming 92 from an originating access point to one of the candidate access points on an affiliated channel for roaming Another step includes recording 94, in a link record in the mobile subscriber unit, an entry including an identity of the originating access point, an identity of the candidate access point, the affiliated channel for roaming, and a handoff experience value, which is quantified using parameters including an indicator as to how well the handoff was completed. This entry can also include a creation time of the entry and an identifier of the mobile subscriber unit that created the entry. This entry can further include a number of times that the entry has been used for handoffs. Along with the entry the link record also records a complementary entry that assumes a reverse handoff from the candidate access point to the originating access point using the same affiliated channels for handoff and having the same handoff experience value. The link record builds a map of the access points and the affiliated channels used in the network from previous handoffs of the mobile subscriber unit.

Optionally, mobile subscriber units can share 99 their link record with other mobile subscriber units such that each mobile subscriber unit can integrate its entries with those entries from other mobile subscriber units, where integrating entries includes adding new entries concerning access points and affiliated channels not used before by the mobile subscriber unit, and overwriting entries concerning access points and affiliated channels used earlier by the mobile subscriber unit with later information.

Another step includes using 96 the link record upon subsequent roaming to attempt a self-devised handoff without further scanning for access points and affiliated channels. In particular, the entry having the highest handoff experience value is used for the self-devised handoff attempt without performing any scanning for access points or channels.

If the self-devised handoff attempt fails 98, then returning to the scanning step 90 to actively scan as usual. Otherwise, continuing with the recording step 94. If upon a handoff, the handoff experience has changed from that previously recorded in the link record, the recording step includes deleting an earlier recorded entry if there is a conflict with information resulting from a later handoff.

Advantageously, the present invention establishes a map of potential handoff links that can be used without the need to scan for potential handoff candidates, which saves time and reduces the need for communication overhead for handoffs. The present invention operates in a dynamic manner, and it does not need to waste resources or time in the active processing of RF conditions to establish a map of potential handoff links. Such a map can be shared directly between mobile units without invoking an access point or centralized database of maps.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs for ICs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for establishing mobile connectivity conditions for mobile subscriber units in a wireless communication network, the method comprising the steps of:
scanning, by each mobile subscriber unit, for candidate access points and affiliated channels for roaming;
roaming from an originating access point to one of the candidate access points on an affiliated channel for roaming;
recording, in a link record in the mobile subscriber unit, an entry including an identity of the originating access point, an identity of the candidate access point, the affiliated channel for roaming, and a handoff experience value; and
using the link record upon subsequent roaming to attempt a self-devised handoff without further scanning for access points and affiliated channels,
wherein,
in the recording step, the handoff experience value is quantified using parameters including an indicator as to how well the handoff was completed, and
the using step uses the entry having a highest handoff experience value for the self-devised handoff attempt.

2. The method of claim 1, wherein the handoff experience value includes a measurement of a time in finding a handover target.

3. The method of claim 1, wherein the handoff experience value includes: a total speed of an IEEE 802.11 stage of the handoff, a total speed of a WLAN-Security stage of the handoff, and how quickly application traffic is resumed after completion of the handoff.

4. The method of claim 1, wherein the handoff experience value includes a number of packet retries needed to secure the successful handoff completion.

5. The method of claim 1, wherein in the recording step the entry also includes a creation time of the entry and an identifier of the mobile subscriber unit that created the entry.

6. The method of claim 1, wherein in the recording step the entry also includes a number of times that the entry has been used for handoffs.

7. The method of claim 1, wherein recording includes recording a complementary entry that assumes a reverse handoff from the candidate access point to the originating access point using the same affiliated channels for handoff and having the same handoff experience value.

8. The method of claim 1, wherein the link record of the recording step builds a map of the access points and the affiliated channels used in the network from previous handoffs of the mobile subscriber unit.

9. The method of claim 1, further comprising the step of mobile subscriber units sharing their link record with other mobile subscriber units such that each mobile subscriber unit can integrate its entries with those entries from other mobile subscriber units.

10. The method of claim 9, wherein integrating entries includes adding new entries concerning access points and affiliated channels not used before by the mobile subscriber unit and overwriting entries concerning access points and affiliated channels used earlier by the mobile subscriber unit with later information.

11. The method of claim 1, wherein during the roaming step, if the self-devised handoff attempts based on the link record list fail, then returning to the scanning step.

12. The method of claim 11, wherein the recording step includes deleting an earlier recorded entry if there is a conflict with information resulting from a later handoff.

13. The method of claim 1, wherein in the using step, the mobile subscriber unit is operable to loop through the list of the link record entries and send a Direct-Probe-Request to each of the record nodes only on the respective affiliated channel, and at the end of the loop, to determine if a response from the Direct-Probe-Request satisfies a criteria of expected coverage from the responding access points.

14. The method of claim 13, wherein if the expected criteria are not fulfilled then the mobile subscriber unit loops through the list of the link record entries in a second phase, fetching only the different channels that are recorded in the affiliated channel parameters, and sending a Broadcast-Probe-Request on each of the channels.

15. The method of claim 1, wherein the using step includes using the link record to improve scanning that is related to an ongoing roaming operation and in a context of a non-roaming operation sequence.

16. A mobile subscriber unit operable to establish mobile connectivity conditions in a wireless communication network, the mobile subscriber unit comprising:
   a transceiver operable to scan for candidate access points and affiliated channels for roaming;
   a processor coupled to the transceiver, the processor operable to direct roaming of the mobile subscriber unit from an originating access point to one of the candidate access points on an affiliated channel for roaming; and
   a memory coupled to the processor, the memory operable to record, in a link record, an entry including an identity of the originating access point, an identity of the candidate access point, the affiliated channel for roaming, and a handoff experience value,
   wherein,
   the processor is further operable to use the link record upon subsequent roaming of the mobile subscriber unit to attempt a self-devised handoff without having the transceiver perform further scanning for access points and affiliated channels,
   the handoff experience value is quantified using parameters including an indicator as to how well the handoff was completed, and
   the entry includes a highest handoff experience value for the self-devised handoff attempt.

17. A method for establishing mobile connectivity conditions for mobile subscriber units in a wireless communication network, the method comprising the steps of:
   scanning, by each mobile subscriber unit, for candidate access points and affiliated channels for roaming;
   roaming from an originating access point to one of the candidate access points on an affiliated channel for roaming;
   recording, in a link record in the mobile subscriber unit, an entry including an identity of the originating access point, an identity of the candidate access point, the affiliated channel for roaming, and a handoff experience value; and
   using the link record upon subsequent roaming to attempt a self-devised handoff without further scanning for access points and affiliated channels,
   wherein,
   the entry includes a creation time of the entry and an identifier of the mobile subscriber unit that created the entry.

* * * * *